United States Patent
Xu et al.

(10) Patent No.: US 9,749,961 B2
(45) Date of Patent: Aug. 29, 2017

(54) METHOD FOR CONTROLLING HIBERNATION OF NODES OF WIRELESS SENSOR NETWORK

(71) Applicant: Tsinghua University, Beijing (CN)

(72) Inventors: Ke Xu, Beijing (CN); Yi Qu, Beijing (CN); Wenlong Chen, Beijing (CN)

(73) Assignee: Tsingua University, Beijing (CN)

( * ) Notice: Subject to any disclaimer, the term of this patent is extended or adjusted under 35 U.S.C. 154(b) by 179 days.

(21) Appl. No.: 14/511,563

(22) Filed: Oct. 10, 2014

(65) Prior Publication Data

US 2015/0103716 A1  Apr. 16, 2015

(30) Foreign Application Priority Data

Oct. 11, 2013  (CN) .......................... 2013 1 0474024

(51) Int. Cl.
*H04W 52/02* (2009.01)
(52) U.S. Cl.
CPC ......... *H04W 52/0274* (2013.01); *Y02B 60/50* (2013.01)

(58) Field of Classification Search
None
See application file for complete search history.

(56) References Cited

U.S. PATENT DOCUMENTS

| 2012/0218926 | A1* | 8/2012 | Wang | ................ | H04W 52/0216 370/311 |
| 2015/0103707 | A1* | 4/2015 | Panta | ................ | H04W 52/0203 370/311 |

* cited by examiner

*Primary Examiner* — Kevin C Harper
*Assistant Examiner* — Jeff Banthrongsack
(74) *Attorney, Agent, or Firm* — Kile Park Reed & Houtteman LLC

(57) ABSTRACT

In a method for controlling hibernation of nodes of a wireless sensor network (WSN), the nodes are classified into a number of groups, each of which monitors one location and has at least two nodes. Redundant hibernation is applied to the nodes in each group. MAC layer hibernation is further applied to each node.

7 Claims, 8 Drawing Sheets

METHOD FOR CONTROLLING HIBERNATION OF NODES OF WIRELESS SENSOR NETWORK

CROSS-REFERENCE TO RELATED APPLICATION

This application claims priority to and benefits of Chinese Patent Application Serial No. 201310474024.6, filed with the State Intellectual Property Office of P. R. China on Oct. 11, 2013, the entire contents of which are incorporated herein by reference.

FIELD

The present disclosure relates to wireless sensor networks (WSNs), and particularly to a method for controlling hibernation of nodes of a WSN.

BACKGROUND

A wireless sensor network (WSN) of spatially distributed autonomous nodes can monitor physical or environmental conditions, such as temperature, sound, pressure, etc. and cooperatively pass data through a wireless network to a base station (or sink node) for data processing.

Each node has typically several parts: a sensor, a radio transceiver with an internal antenna or connection to an external antenna, a microcontroller, an electronic circuit for interfacing with the sensor, and an energy source, usually a battery or an embedded form of energy harvesting. Size and cost constraints on the node result in corresponding constraints on resources such as energy, memory, computational speed and communications bandwidth. As such, energy saving is a problem for deploying the WSN.

SUMMARY

According to an aspect of the present disclosure, a method for controlling hibernation of nodes of wireless sensor network (WSN) includes the following steps: classifying the nodes into a plurality of groups, each of which is for monitoring one location and comprises at least two nodes; applying redundant hibernation technology to the nodes in each group, the period of the redundant hibernation comprising a working time and a hibernation time, the node in the group working in the working time and hibernating in the hibernation time; and applying MAC layer hibernation technology to each node, the period of the redundant hibernation comprising a plurality of detecting periods, each of which comprising a detecting working time and a detecting hibernation time, the node working in the detecting working time and hibernating in the detecting hibernation time.

In one embodiment, the number of the nodes in the group is n, only one node is working and the other n−1 nodes are in hibernation, the working time $T_w$ for the node is $$T_w = \frac{T}{n},$$

and the hibernation time $T_s$ of the node is $$T_s = T - T_w = \frac{n-1}{n} \times T.$$

In one embodiment, the MAC layer hibernation technology is selected from the group consisting of an X-MAC, B-MAC and Contiki-MAC technologies.

In one embodiment, the MAC layer hibernation technology has a natural period and the detecting period is the natural period.

In one embodiment, the number of the detecting periods is k, where k is a positive integer, the node enters the detecting working time at the beginning of each detecting period, detecting channels, transmitting and receiving data, and then enters the detecting hibernation time.

In one embodiment, the step of applying the MAC layer hibernation technology comprises:

detecting if there is data to receive in the detecting working time;

receiving the data if there is data to receive and feeding back information after the data receiving is finished, and then hibernating;

detecting if there is data to transmit in the detecting working time if there is no data to receive;

transmitting the data if there is data to transmit and feeding back information, and then hibernating; and hibernating directly if no data needs to receive and transmit.

In one embodiment, if the node needs to transmit and receive data both, the node transmit data first and then receive data or vice versa.

In one embodiment, if the node detects channels and transmits and receives data at the end of the detecting working time, the node does not enters the detecting hibernation time until the node finishes the channel detecting, and data transmitting and receiving.

As employing both the redundant hibernation technology and the MAC layer hibernation technology, the node have double hibernations, and closes the channel detecting except in the detecting working time. As such, energy saving efficiency can be significantly increased.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Figure 1:
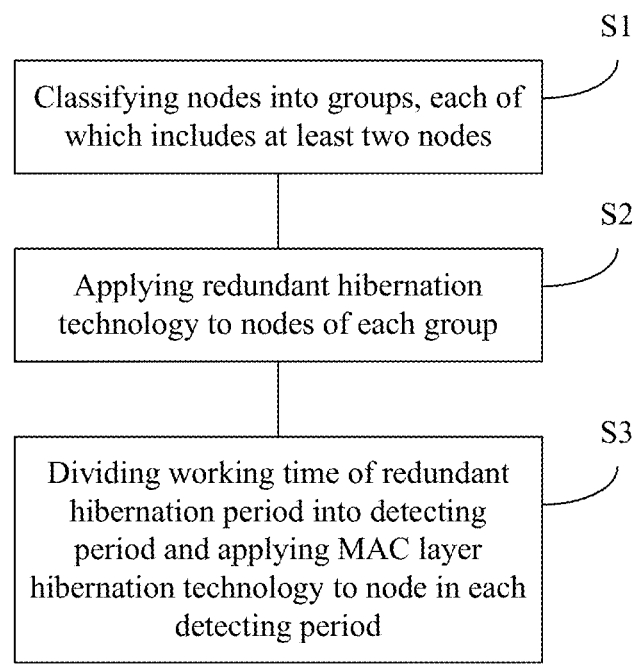
FIG. 1 is a flow chart of a method for controlling hibernation of nodes of a WSN, according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied. Moreover, a structure in which a first feature is "on" a second feature may include an embodiment in which the first feature directly contacts the second feature, and may also include an embodiment in which an additional feature is formed between the first feature and the second feature so that the first feature does not directly contact the second feature.

In addition, terms such as "first" and "second" are used herein for purposes of description and are not intended to indicate or imply relative importance or significance or imply a number of technical features indicated. Therefore, a "first" or "second" feature may explicitly or implicitly comprise one or more features. Further, in the description, unless indicated otherwise, "a plurality of" refers to two or more.

FIG. 1 is a flow chart of a method for controlling hibernation of nodes of a WSN, according to an embodiment of the present disclosure.

S1: The nodes of the WSN are classified into a number of groups. Each group includes at least two nodes. Numbers of the nodes in the groups can be equal to or different from each other.

S2: Redundant hibernation technology is applied to the nodes in each group. A period T of hibernation includes a working time $T_w$ and a hibernation time $T_w$. The node receives and transmits data during the working time $T_w$, while wireless communication of the node is turned off during the hibernation time $T_s$, that is, the node does not receive or transmit any data during the hibernation time $T_s$.

If the number of the nodes in the group is n, as the redundant hibernation technology is employed, only one node is working and the other n−1 nodes are in hibernation. As such, the working time $T_w$ for the node is $$T_w = \frac{T}{n},$$

and the hibernation time $T_s$ of the node is $$T_s = T - T_w = \frac{n-1}{n} \times T.$$

S3: the working time $T_w$ includes a number of detecting periods t, each of which includes a detecting working time $t_w$ and a detecting hibernation time $t_s$. In each detecting period t, MAC layer hibernation technology is employed, the node detects channels in the detecting working time $t_w$ and closes the channel detecting during the detecting hibernation time $t_s$. However, it should be noted that the node may receive and transmit data during the detecting hibernation time $t_s$, that is, only the channel detecting is turned off while the data receiving/transmitting function keeps working during the detecting hibernation time $t_s$.

The MAC layer hibernation technology can be an X-MAC, B-MAC, or Contiki-MAC technology. The MAC layer hibernation technology has a natural period and the detecting period t is the natural period.

As such, if the number of the detecting periods t is k, that is, $T_w = k \times t$, where k is a positive integer. The node enters the detecting working time $t_w$ at the beginning of each detecting period t, detecting channels, transmitting and receiving data, and then enters the detecting hibernation time $t_s$, that is, $t = t_w + t_s$.

Figure 2:
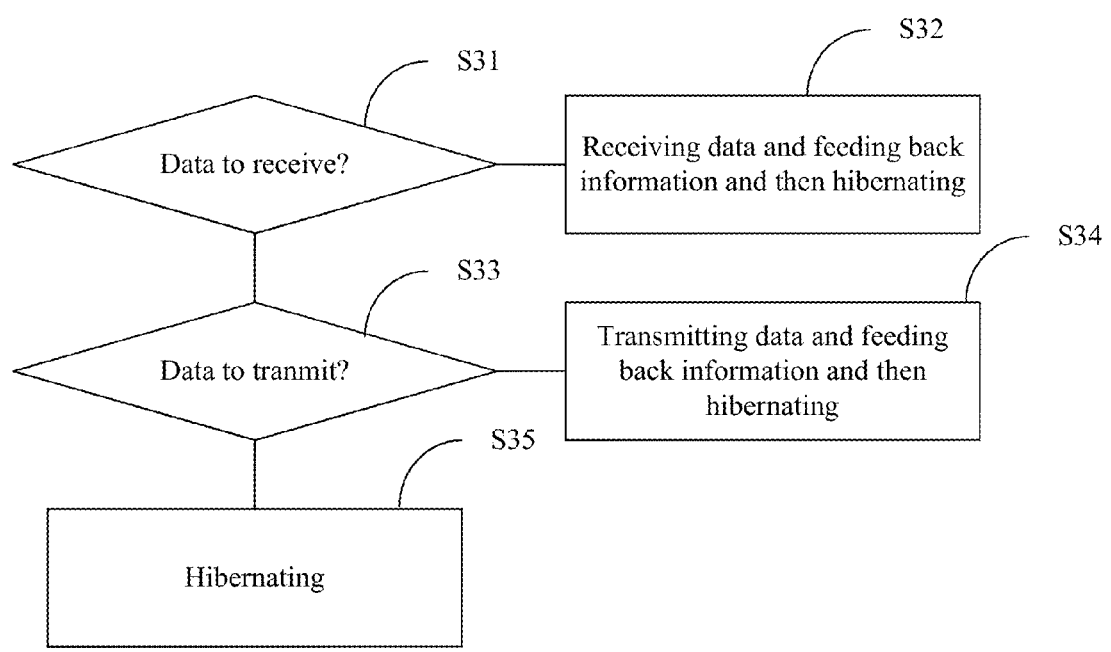
FIG. 2 is a flow chart of a step of the method for controlling hibernation of the nodes of the WSN, according to an embodiment of the present disclosure.

FIG. 2 is a flow chart of a step of the method for controlling hibernation of the nodes of the WSN. Specifically, the step S3 includes the following sub-steps.

S31: the node detects if there is data to receive in the detecting working time $t_w$.

S32: if there is data to receive, the node receives the data and feeds back information after the data receiving is finished, and then hibernates.

S33: if there is no data to receive, the node detects if there is data to transmit in the detecting working time $t_w$.

S34: if there is data to transmit, the node transmits the data and feeds back information, and then hibernates.

S35: if no data needs to receive and transmit, the node hibernates directly.

If the node needs to transmit and receive data both, the node can transmit data first and then receive data or vice versa. However, the node cannot transmit and receive data simultaneously.

If the node detects channels and transmits and receives data at the end of the detecting working time $t_w$, the node will not enters the detecting hibernation time $t_s$ until the node finishes the channel detecting, and data transmitting and receiving.

As employing both the redundant hibernation technology and the MAC layer hibernation technology, the node have double hibernations, and closes the channel detecting except in the detecting working time $t_w$. As such, energy saving efficiency can be significantly increased.

For better understanding, examples of the method are given below.

Figure 3:
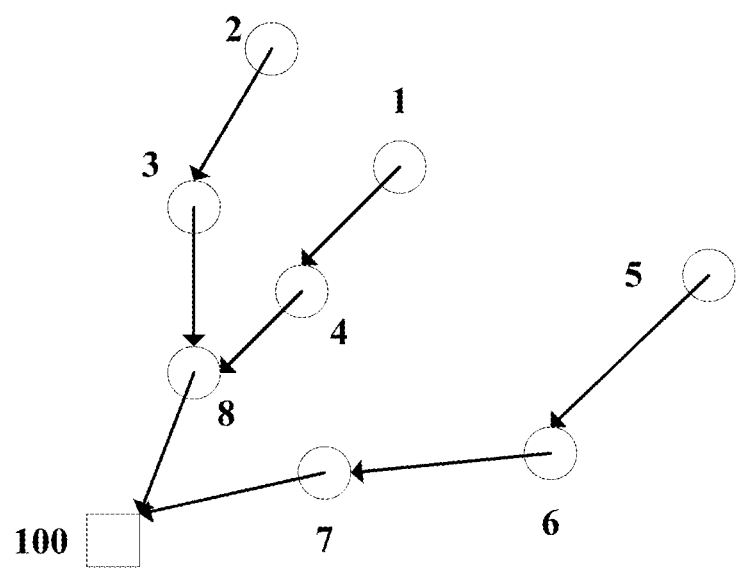
FIG. 3 shows an example of a traditional WSN.

FIG. 3 shows an example of a traditional WSN. The traditional WSN includes nodes 1-8 distributed at eight locations, and the nodes pass the data to the base station 100 for data processing.

Figure 4:
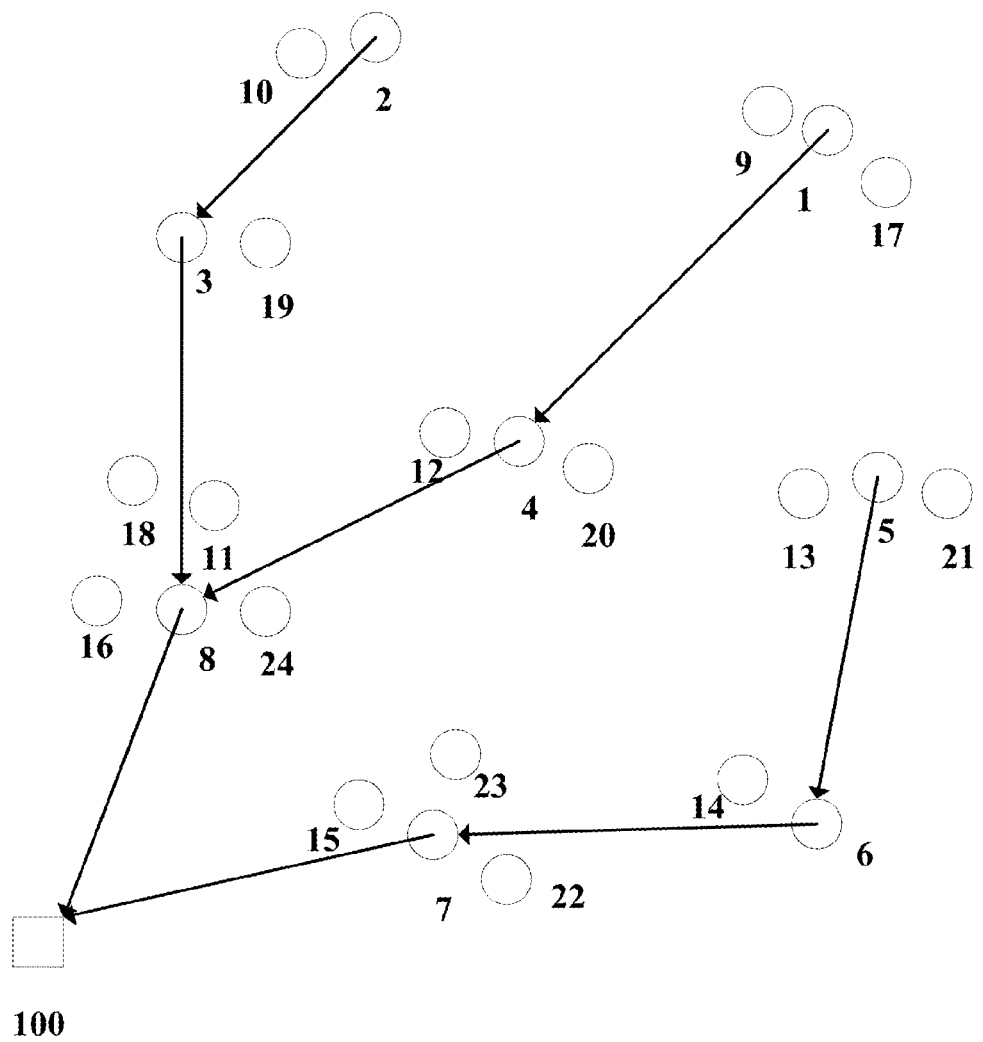
FIG. 4 shows an example of a WSN with redundant nodes in each location being monitored.

FIG. 4 shows an example of a WSN of present disclosure. To apply the redundant hibernation technology, one or more redundant node is employed to each location and thus forms a group of nodes. The group will cooperatively detect channel, transmit and receive data for that location, that is, one is active while the other hibernate.

Figure 5:
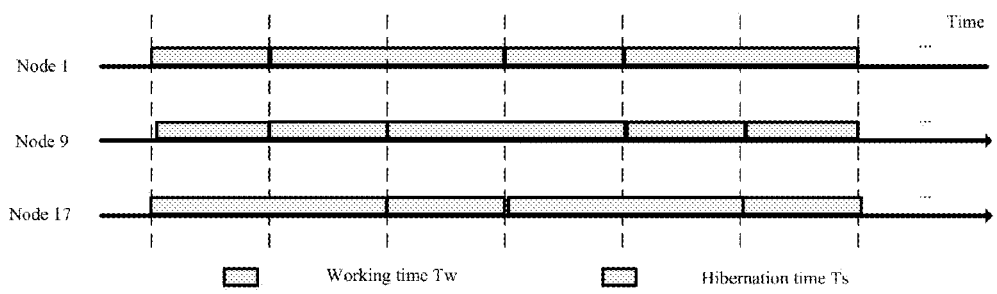
FIG. 5 shows how to control the nodes of the WSN of FIG. 4 to hibernate according to the present disclosure.

FIG. 5 shows how to control the nodes of the WSN of FIG. 4 to hibernate according to the present disclosure. Taking the group having the node 1 as an example, the group includes nodes 9 and 17 in addition to the node 1. By employing the redundant hibernation technology, the nodes 1, 7, 19 work for the working time $T_w$ in turn and then take hibernation for the hibernation time $T_s$ (in this example, $T_s=2\ T_w$). Loading on the location is shared by the nodes 1, 7, 19 and, by employing the redundant hibernation technology, energy saving is improved.

Figure 6:
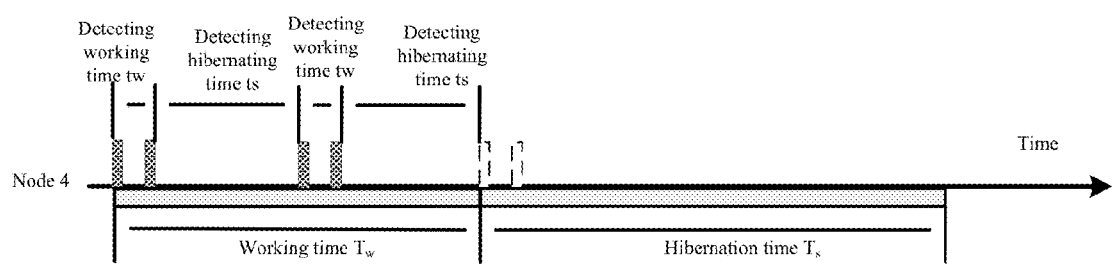
FIG. 6 shows how to control the nodes of the WSN of FIG. 4 to hibernate according to an embodiment of present disclosure.

FIG. 6 shows how to control the nodes of the WSN of FIG. 4 to hibernate according to an embodiment of the present disclosure. The redundant hibernation technology is applied to each group. Then, for each node, taking the node 4 as an example, by employing the MAC layer hibernation technology, the node 4 only work for the detecting working time $t_w$ and then take hibernation for the detecting hibernating time $t_s$ (in this example, k=2) in each working time $T_w$. As such, the node 4 have double hibernations, loading on the node 4 is further decreased, and energy saving is further improved.

Figure 7:
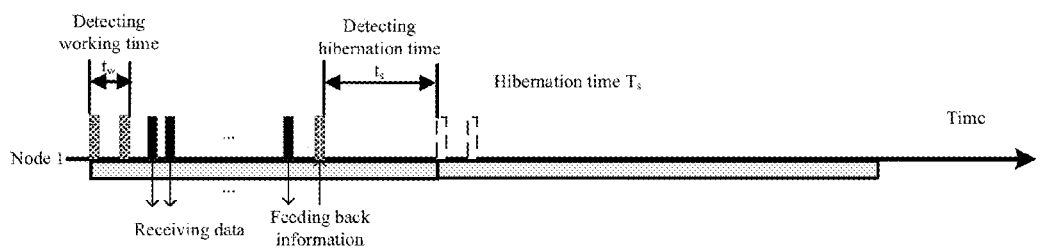
FIG. 7 shows how to control the nodes of the WSN of FIG. 4 to hibernate according to another embodiment of present disclosure.

FIG. 7 shows how to control the nodes of the WSN of FIG. 4 to hibernate according to another embodiment of present disclosure. In this embodiment, the node 1 is taken as an example. The node 1 receives data at the end of the detecting working time $t_w$, and does not enters the detecting hibernation time $t_s$ until the node finishes the data receiving and information feedback.

Figure 8:
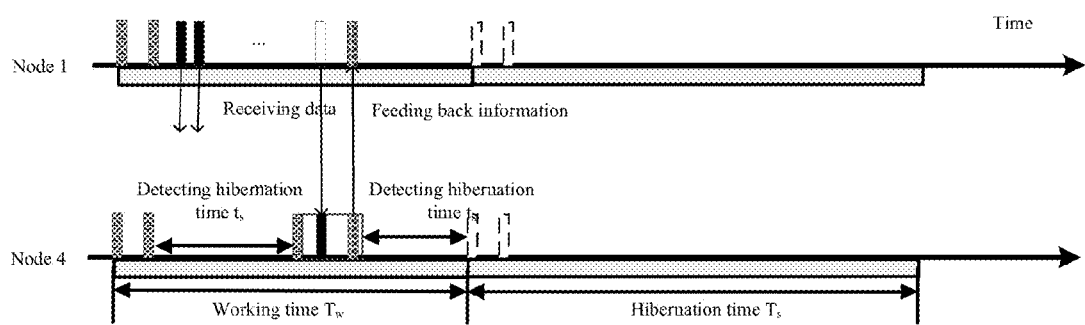
FIG. 8 shows how to control the nodes of the WSN of FIG. 4 to hibernate according to further another embodiment of present disclosure.

FIG. 8 shows how to control the nodes of the WSN of FIG. 4 to hibernate according to further another embodiment of present disclosure. In this embodiment, the nodes 1, 4 are taken as an example. The node 1 transmits data to the node 4 during the node 4 is in hibernation. Thus, the node 4 does not answer and the node 1 keeps transmitting the data until the node 4 wakes up in the detecting working time $t_w$. Then the data is received by the node 4 and information is fed back. Both the nodes 1, 4 enter into detecting hibernation time $t_s$.

Reference throughout this specification to "an embodiment", "some embodiments", "one embodiment", "an example", "a specific examples", or "some examples" means that a particular feature, structure, material, or characteristic described in connection with the embodiment or example is included in at least one embodiment or example of the disclosure. Thus, the appearances of the phrases such as "in some embodiments", "in one embodiment", "in an embodiment", "an example", "a specific examples", or "some examples" in various places throughout this specification are not necessarily referring to the same embodiment or example of the disclosure. Furthermore, the particular features, structures, materials, or characteristics may be combined in any suitable manner in one or more embodiments or examples.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. A method for controlling hibernation of nodes of wireless sensor network (WSN), the method comprising:

classifying the nodes into a plurality of groups, each of which is for monitoring one location and comprises at least two nodes;

applying redundant hibernation technology to the nodes in each group, the period of the redundant hibernation comprising a working time and a hibernation time, the node in the group working in the working time and hibernating in the hibernation time; and applying MAC layer hibernation technology to each of the nodes, the working time of the period of the redundant hibernation comprising a plurality of detecting periods, each of which comprises a detecting working time and a detecting hibernation time, the node working in the detecting working time and hibernating in the detecting hibernation time;

wherein the number of the nodes in the group is n, only one of the nodes is working and the other n−1 nodes are in hibernation, the working time $T_w$ for the node is $$T_w = \frac{T}{n},$$

and the hibernation time $T_s$ of the node is $$T_s = T - T_w = \frac{n-1}{n} \times T.$$

2. The method of claim 1, wherein the MAC layer hibernation technology is selected from the group consisting of an X-MAC, B-MAC, and Contiki-MAC technologies.

3. The method of claim 1, wherein the MAC layer hibernation technology has a natural period and the detecting period is the natural period.

4. The method of claim 1, wherein the number of the detecting periods is k, where k is a positive integer, the node enters the detecting working time at the beginning of each detecting period, detecting channels, transmitting and receiving data, and then enters the detecting hibernation time.

5. The method of claim 1, wherein the step of applying the MAC layer hibernation technology comprises:

detecting if there is data to receive in the detecting working time;

receiving the data if there is data to receive and feeding back information after the data receiving is finished, and then hibernating;

detecting if there is data to transmit in the detecting working time if there is no data to receive;

transmitting the data if there is data to transmit and feeding back information, and then hibernating; and hibernating directly if no data needs to receive and transmit.

6. The method of claim 1, wherein if the node needs to transmit and receive data both, the node transmit data first and then receive data or vice versa.

7. The method of claim 1, wherein if the node detects channels and transmits and receives data at the end of the detecting working time, the node does not enter the detecting hibernation time until the node finishes the channel detecting, and data transmitting and receiving.

* * * * *